United States Patent Office 3,501,210
Patented Mar. 17, 1970

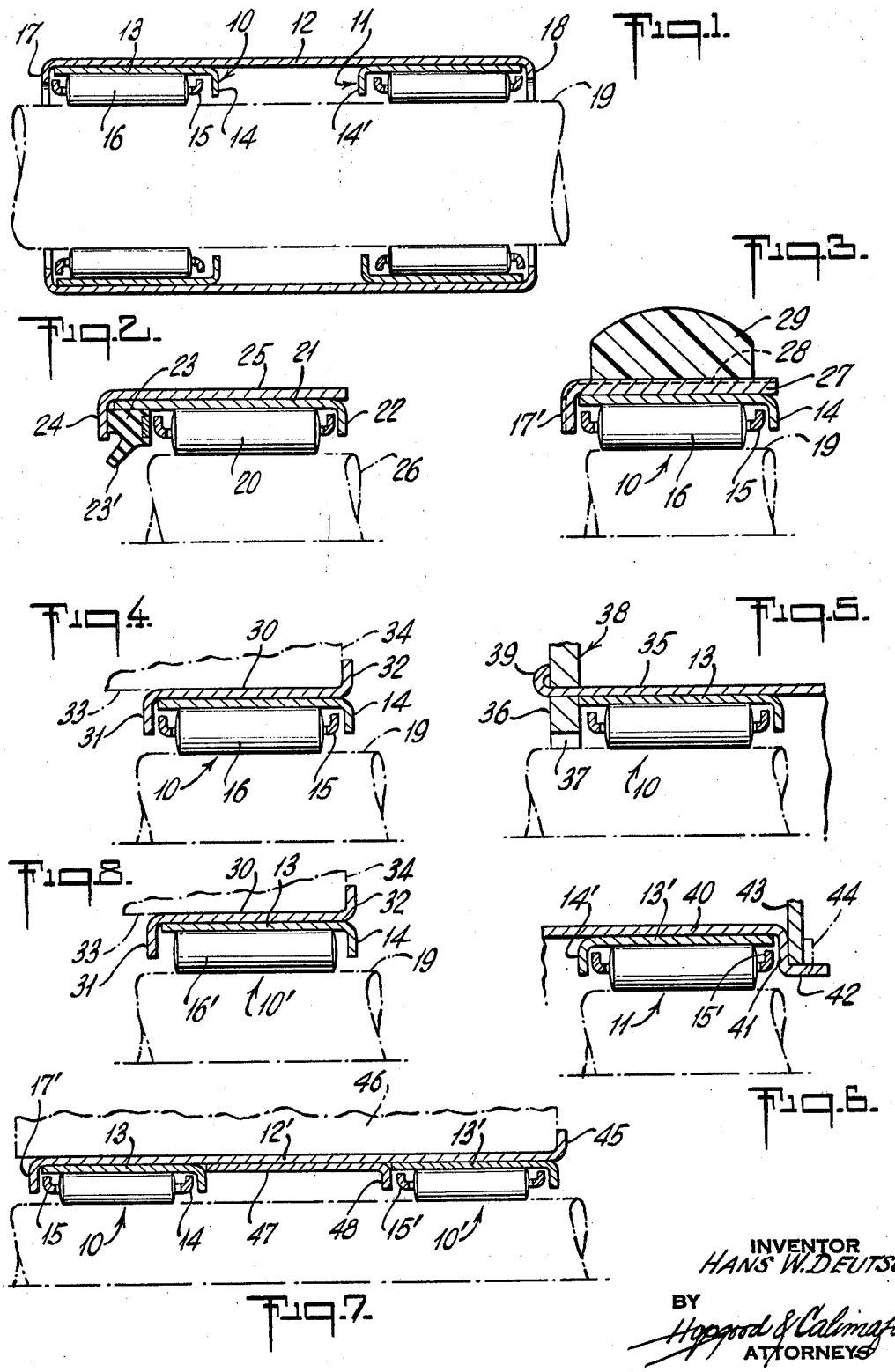

3,501,210
SHELL-TYPE ROLLER BEARING
Hans W. Deutsch, West Hartford, Conn., assignor, by mesne assignments, to Industriewerk Schaeffler OHG, Herzogenaurach, Germany, a partnership of Germany
Filed May 21, 1968, Ser. No. 730,735
Int. Cl. F16c 13/00, 33/46, 27/00
U.S. Cl. 308—212                2 Claims

ABSTRACT OF THE DISCLOSURE

The invention contemplates a roller-bearing subassembly of elemental simplicity, comprising a hardened drawn raceway sleeve, integrally inwardly flanged at one end, and carrying a plurality of rollers or needles. This subassembly, as a unit, is interference-fitted, clamped or otherwise held to the bore of a relatively soft outer member which carries an inward flange at one end. The latter flange locates the unflanged end of the raceway sleeve; it also, in conjunction with the flange of the raceway sleeve, provides axial-locating or thrust-sustaining functions for the roller complement. The relatively soft outer member may be variously formed for completion of multiple-row combinations of the roller subassemblies, and for ultimate location of the bearing unit on a frame or other structure.

---

This invention relates to so-called shell-type roller or needle bearings, namely, the variety in which a complete unit of outer race and its complement of rollers or needles is self-retained or unit-handling, in readiness for later assembly to a shaft (or the like) on which the rollers ride.

Prior bearing constructions have been unduly complex and expensive, requiring further complexity for achievement of ultimate mounting. For example, the employment of hardened parts has dictated that separate bearing-retaining parts or housings be provided, unique for the particular desired ultimate use or application.

It is an object of this invention to provide a shell-type roller-bearing construction having economies, efficiency, and mounting flexibility beyond prior constructions.

Another object is to provide a bearing of the character indicated wherein the number of hardened parts is kept to a minimum.

A further object is to provide a bearing of the character indicated complete with mounting structure.

It is also an object to provide a bearing of the character indicated as a unit which will inherently permit the fastening of a shell-type bearing to an assembly, rather than within an assembly.

Other objects and various features of novelty and invention will be pointed out or will occur to those skilled in the art from a reading of the following specification in conjunction with the accompanying drawings. In said drawings, which show, for illustrative purposes only, preferred forms of the invention:

FIG. 1 is a longitudinal sectional view through a bearing of the invention; and

FIGS. 2 to 8 are similar views for alternative and modified constructions.

Briefly stated, the invention contemplates a roller-bearing subassembly of elemental simplicity, comprising a hardened drawn raceway sleeve, integrally inwardly flanged at one end, and carrying a plurality of rollers or needles. This subassembly, as a unit, is interference-fitted, clamped or otherwise held to the bore of a relatively soft outer member which carries an inward flange at one end. The latter flange locates the unflanged end of the raceway sleeve; it also, in conjunction with the flange of the raceway sleeve, provides axial-locating or thrust-sustaining functions for the roller complement. The relatively soft outer member may be variously formed for completion of multiple-row combinations of the roller subassemblies, and for ultimate location of the bearing unit on a frame or other structure.

In FIG. 1, the invention is shown in application to a twin-row roller-bearing assembly involving two like subassemblies 10–11 telescoped within an outer bore, which may be drilled in a casting or other frame part but which in the form shown is provided by an elongated tubular member 12. The subassembly 10 is shown to comprise a sleeve or raceway element 13 with an integral radially inward flange 14 at one axial end, so that the other axial end may be said to be straight-cylindrical. Plural rollers or needles 16 are retained within the raceway element 13 and against radially inward loss; in the form shown, this is accomplished by cage 15 which extends the length of rollers 16. The axial ends of the cage 15 extend circumferentially and, in the case of the end adjacent the flange 14, there is a radial overlap relation for axial-locating purposes. The outer raceway or sleeve 13 is carburized or hardened for efficient load-sustaining and long-life purposes. It is preferably a drawn-steel shell, with the flange 14 integrally formed therewith.

The basic structure of the subassembly 11 is a duplicate of that already described for the subassembly 10, and the parts will not therefore be again identified. However, for the arrangement of FIG. 1, it is sufficient to note that the orientation of the roller subassemblies 10–11 may be in axial back-to-back relation, with the integral flanges, 14 for the case of assembly 10, and 14' for the case of assembly 11, are inward of the axial ends of the complete assembly.

The outer member or tube 12 is preferably of relatively soft, i.e., unhardened material so as to permit spinning or other deformation of the ends in order to define flanges 17–18. Also, the bore of the tube or outer member 12 preferably has an interference-fit relation with the hardened outer raceway members of the subassemblies 10–11. The interference-fit assures axial positioning along the length of the tube 12, and the flanges 17–18 may be formed radially inwardly after the press-fit by which the subassemblies 10–11 are positioned in the tube 12. Alternatively, one of the flanges 17 may be radially inwardly formed prior to the introduction of either subassembly 10–11 into the tube 12. The radial extent of flanges 17–18 is such as to locate the unflanged ends of the adjacent subassemblies 10–11 and also to provide a thrust-sustaining or axial-limiting function for the adjacent end of the respective cages of the subassemblies.

The described structure of FIG. 1 is a complete twin-row bearing unit which is unit-handling and immediately adaptable for insertion into an ultimate frame or the like structure. Also, the assembly is in readiness to receive an inserted shaft (suggested by phantom outline 19), on which the rollers of the respective subassemblies will ultimately ride.

The arrangement of FIG. 2 is essentially the structure of FIG. 1, except that the showing is limited to a single row of roller elements 20 within the single hardened outer-raceway member 21, having an integral flange 22 at one axial end. The other axial end is again right-cylindrical but is suitably extended beyond the axial limit of the rollers 20 in order to accommodate sealing and thrust-absorbing means 23 retained within the flanged limit 24 of the relatively soft outer tubular member 25. As far as the suggested shaft outline 26 is concerned, FIG. 2 depicts an instant of time during the insertion of the shaft 26, just prior to the shaft interfering with the lip 23' of the resilient seal; it will be understood that further insertion will deflect the lip for hugging and sealing contact with the shaft. Again, the outer raceway sleeve 21 has interference-fit relation with the outer member 25.

In the arrangement of FIG. 3, the basic roller-bearing subassembly parts will be recognized within roughened outer surface, suggested by dashed line 28. The roughening may be characterized by flutings or knurled formations so as to permit secure bonding or anchorage to a moldable member 29 such as a plasticized rim, tire, or roll with which it is united. In the form shown, the moldable member 29 has a rounded outer contour, which may serve to provide a cam follower; when this contour is spherical, with a radius centered on the shaft axis, the bearing will be understood to serve a self-aligning function, as within the similarly spherical socket of a pillow-block or the like.

In the arrangement of FIG. 4, the basic subassembly 10 will again be recognized as fitted to an outer member 30 having a radially inner flange 31 at one axial end, and having a radially outer flange 32 at the other axial end. The member 30 may again be of relatively soft metal so as to lend itself to deformation not only upon establishing the interference-fit relation with the bearing subassembly, but also if desired, in order to complete outward assembly to the frame or other structure in which it is to serve its bearing function. In the arrangement of FIG. 4, the subassembly 10, when assembled to the bore of the outer member 30, constitutes a complete bearing unit which may be press-fitted into or clamped within the bore 33 of frame or other structure 34, for ultimate mounting; in such a situation, the radially outer flange 32 serves an axial-locating function within the ultimate assembly.

In the arrangement of FIG. 5, the subassembly 10 will again be recognized, in the context of an outer member 35 which is not integrally formed with its radially inwardly extending flange 36. The latter is shown nevertheless carried by the outer member 35, or secured thereto. In the form shown, the flange 36 is actually the inner rim or lip of a bore or cut-out 37 formed in a plate, designated generally 38, which may be part of the frame of the machine in which the bearing is to be assembled. The outer member 35 may be secured to this plate by slitting the axial end of the member 35 to define projecting lugs 39 which in turn are received in slotted openings in the plate 38; thus received, the lugs 39 are spun or otherwise bent over against the outer face of the plate 38 for permanent retention. It will be understood that, thus retained, the outer raceway member 13 and cage 15 of the subassembly 10 are in abutting or other axial-locating relation with the plate 38 at flange 36.

FIG. 6 illustrates still another modification embodying the basic roller-bearing subassembly which has already been described. This subassembly in FIG. 6 is given the designation 11 because the flanged end of the outer raceway sleeve 13' has the orientation which has been described at 11 in FIG. 1. The outer tubular member 40 again preferably receives this subassembly 11 with a forced or interference-fit, and in the case of FIG. 6, the outer limit of the relatively soft outer member 40 is formed with a radially inner flange 41 in locating and limiting relation with the raceway sleeve 13' and with the cage 15' of the subassembly. In addition, the flanged end 41 includes an axially projecting part 42 on which a frame plate 43 may be located, and because of the relatively soft nature of the outer member 40, the assembly to plate 43 may be completed by spinning or otherwise deforming the remainder of the projecting end 42, as into the position shown in dashed outline 44.

It will be understood that in the various forms which have been described, the basic needle-roller subassembly may be accommodated in single-row, twin-row, or other multiples, for desired load-sustaining functions and mountings. For example, FIG. 7 shows applicability to another multiple-row configuration involving the roller-bearing subassemblies 10 and 10' contained within the outer tubular member 12'. The outer tubular member 12' differs from that in FIG. 1 by provision of a radially outer flange 45 at one axial end, to limit insertion of the complete bearing assembly into the ultimate structure, suggested at phantom outline 46. The outer tubular member 12' at its other end includes the radially inward flange 17' which serves to locate both the straight-cylindrical end of the raceway 13, and the adjacent end of the cage 15. The next subassembly row may be an exact duplicate of that identified at 10 and may be directly adjacent the row 10. Such a second row of the subassembly unit 10 is not shown in FIG. 7, but it will be understood that if it is desired to have adjacent rows of needles or rollers, the next row may have exactly the same orientation as that of the row 10. In other words, the straight-cylindrical end of the outer raceway 13 for the next row may directly abut and be located by the integral flange 14 of the first-inserted row or subassembly 10.

In the form shown, however, the second or other row 10' is asembled in substantially spaced relation with the first row 10. The spacing is achieved by a spacer element 47 which may in all respects resemble the outer-raceway member for a subassembly, but there is no need for hardening the same, because no roller load is sustained thereby. Thus, the sleeve 47 may have its straight-cylindrical end in direct abutment with the flange 14, and its radialy inward flange 48 at the other end may serve for axial location of the outer-raceway member 13' of the second roller subassembly 10'. Flange 48 may also serve thrust-sustaining or axial-limiting functions for the adjacent end of the cage 15' of the subassembly 10'.

In FIG. 8, I show that principles of the invention are applicable beyond the caged embodiments which have been described. FIG. 8 depicts a full-complement bearing 10', in which the raceway sleeve 13 accommodates a maximum plurality of rollers 16', and in which the axial-limiting or thrust-sustaining functions of flanges 14–31 are performed by direct abutment or interference with the respective corresponding ends of the rollers 16', rather than indirectly via cage ends, as in FIGS. 1 to 7. For unit-handling and assembly purposes, the rollers 16' may be retained or confined within raceway sleeve 13 by means of a suitably stiff grease packing, holding the parts in readiness for insertion of shaft 19 or other inner raceway means.

It will be seen that I have described an improved needle-roller bearing construction in which the advantages of hardened precision parts are retained, and yet the ultimate simplicity of minimum numbers of parts is realized. Flexibility of mounting and use is achieved by relatively soft outer tubular construction in which the hardened raceway parts are receivied with interference-fit. Flanges are held to a minimum, and in the case of the outer-member flanges, these serve the dual function of locating the hardened raceway and the roller complement, or rollers, as the case may be.

Although the invention has been described in detail for the preferred forms shown, it will be understood that modifications may be made without departing from the invention as defined in the claims which follow.

What is claimed is:

1. A shell-type roller bearing, comprising a hardened drawn outer-raceway sleeve having at one axial end an integrally formed radially inwardly directed circumferential flange, the remainder of said sleeve being straight cylindrical, a plurality of cylindrical rollers poised to ride the inner surface of said sleeve, means retaining said rollers in angularly distributed relation confined by said inner surface and against radially inward loss, an outer member of relatively soft metal having a bore in telescoped relation with said sleeve, the outer surface of said outer member being roughened for self-retained ultimate mounting, and radially inwardly directed flange means integrally formed with said outer member and in axial-locating relation with the straight-cylindrical end of said sleeve, both said flange and said flange means providing thrust abutments from axially limiting confinement of said rollers within said bearing.

2. A bearing according to claim 1, and including a plasticized body circumferentially united to and carried with said outer surface of said outer member.

References Cited

UNITED STATES PATENTS 2,624,104  1/1953  Finstead.

FOREIGN PATENTS 631,043  10/1949  Great Britain.

MARTIN P. SCHWADRON, Primary Examiner

FRANK SUSKO, Assistant Examiner

U.S. Cl. X.R.

308—184, 194